(12) United States Patent
Freyermuth et al.

(10) Patent No.: US 10,113,608 B2
(45) Date of Patent: Oct. 30, 2018

(54) MOVABLE AXIAL ELEMENT FOR A ROTARY TOOL DAMPENING SYSTEM

(71) Applicant: SECO-E.P.B.(SOCIETE PAR ACTIONS SIMPLIFIEE), Bouxwiller (FR)

(72) Inventors: Alain Freyermuth, Pfaffenhoffen (FR); Yannick Groll, Reitwiller (FR); Pascal Krumhorn, Dauendorf (FR); Mathieu Ostermann, Saverne (FR)

(73) Assignee: SECO-E.P.B.(SOCIETE PAR ACTIONS SIMPLIFIEE), Bouxviller (FR)

( * ) Notice: Subject to any disclaimer, the term of this patent is extended or adjusted under 35 U.S.C. 154(b) by 0 days.

(21) Appl. No.: 14/899,959

(22) PCT Filed: Jun. 12, 2014

(86) PCT No.: PCT/FR2014/051422
§ 371 (c)(1),
(2) Date: Dec. 18, 2015

(87) PCT Pub. No.: WO2014/202869
PCT Pub. Date: Dec. 24, 2014

(65) Prior Publication Data
US 2016/0146288 A1    May 26, 2016

(30) Foreign Application Priority Data

Jun. 20, 2013 (FR) ...................................... 13 55861

(51) Int. Cl.
*F16F 15/02*    (2006.01)
*F16F 13/00*    (2006.01)
(Continued)

(52) U.S. Cl.
CPC .......... *F16F 15/022* (2013.01); *B23B 27/002* (2013.01); *B23B 29/022* (2013.01);
(Continued)

(58) Field of Classification Search
CPC ... B23B 29/022; B23B 27/002; B23B 27/007; B23B 2250/12; B23B 2250/16;
(Continued)

(56) References Cited

U.S. PATENT DOCUMENTS 2,635,898 A * 4/1953 Silverman .............. B62D 37/04
  188/380
2,763,379 A * 9/1956 Danielson ................ B61G 9/14
  213/45

(Continued)

FOREIGN PATENT DOCUMENTS

DE    1897206 U    7/1964
EP    2108473 A1    10/2009
(Continued)

*Primary Examiner* — Robert A. Siconolfi
*Assistant Examiner* — San M Aung
(74) *Attorney, Agent, or Firm* — Corinne R. Gorski

(57) ABSTRACT

A movable axial element for a damping system includes a rectilinear absorbent mass positionable in the housing and having at least one annular groove arranged on a periphery of the absorbent mass and in which at least one elastic element is arranged to bear against an internal wall of the housing. The at least one groove includes a base formed by a shoulder of the absorbent mass. An edge formed by a structure bearing an annular lip is mounted in a sliding manner on at least one part of the shoulder along at least one axis of the movable element to form an adjusting device integrated into the movable element to enable the control of a prestressing exerted by the annular lip on the elastic element mounted on the periphery of the absorbent mass, the (Continued)

prestressing being generated without rotation of the annular lip relative to elastic element.

9 Claims, 2 Drawing Sheets

(51) Int. Cl.
| | |
|---|---|
| *B23C 5/00* | (2006.01) |
| *B32B 27/00* | (2006.01) |
| *B32B 29/02* | (2006.01) |
| *B23B 27/00* | (2006.01) |
| *B23B 29/02* | (2006.01) |
| *F16F 7/108* | (2006.01) |

(52) U.S. Cl.
CPC .............. *B23C 5/003* (2013.01); *F16F 7/108* (2013.01); *F16F 13/005* (2013.01); *B23B 2250/16* (2013.01); *B23B 2260/004* (2013.01); *B23C 2250/16* (2013.01); *B23C 2260/04* (2013.01)

(58) Field of Classification Search
CPC ........... B23B 2560/004; B23Q 17/0976; F16F 7/108; F16F 7/104; F16F 7/1034; F16F 13/005; F16F 15/022; F16F 15/1442; F41B 5/1426; Y10T 408/76; Y10T 409/304312; B23C 5/003; B23C 2250/16; B23C 2260/04; G01M 1/02; F41C 23/06
USPC ............ 188/380, 378, 379, 381, 267.1, 275, 188/322.5; 267/33, 136, 137, 176
See application file for complete search history.

(56) References Cited

U.S. PATENT DOCUMENTS

| | | | | | |
|---|---|---|---|---|---|
| 2,854,100 | A | * | 9/1958 | Oiley | B60G 13/16 188/316 |
| 2,960,189 | A | * | 11/1960 | Osburn | B23Q 17/0976 181/207 |
| 3,242,791 | A | * | 3/1966 | Smith | B23B 29/022 188/379 |
| 3,447,402 | A | * | 6/1969 | Ray | B23B 29/022 408/143 |
| 3,486,585 | A | * | 12/1969 | Hasz | B23Q 17/0976 188/266 |
| 3,690,414 | A | * | 9/1972 | Aggarwal | B23Q 11/0032 188/378 |
| 4,130,185 | A | * | 12/1978 | Densmore | E04B 1/985 174/42 |
| 5,413,318 | A | | 5/1995 | Andreassen | |
| 5,460,156 | A | * | 10/1995 | Sappington | F41B 5/1426 124/89 |
| 5,511,533 | A | * | 4/1996 | Waller | F41B 5/1426 124/89 |
| 5,975,070 | A | * | 11/1999 | Sands | F41B 5/1426 124/89 |
| 6,443,673 | B1 | | 9/2002 | Etling et al. | |
| 2002/0030313 | A1 | * | 3/2002 | Herbst | F16F 1/40 267/136 |
| 2005/0258580 | A1 | | 11/2005 | Digernes | |
| 2006/0275090 | A1 | | 12/2006 | Onozuka et al. | |
| 2009/0257838 | A1 | | 10/2009 | Ostermann et al. | |

FOREIGN PATENT DOCUMENTS

| | | |
|---|---|---|
| FR | 1389016 A | 2/1965 |
| JP | 10250663 A | 9/1998 |
| JP | 20072907 A | 1/2007 |
| WO | 200153025 A | 7/2001 |

* cited by examiner

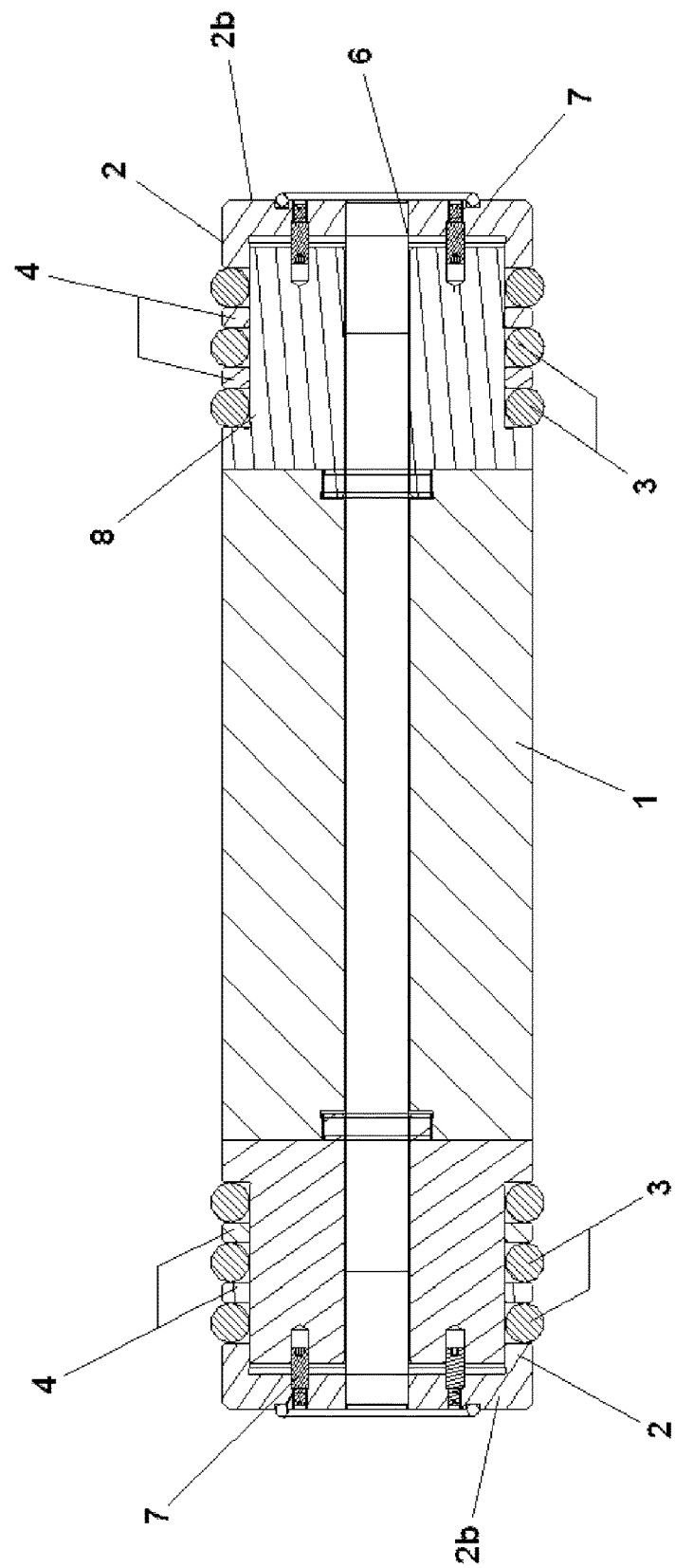

MOVABLE AXIAL ELEMENT FOR A ROTARY TOOL DAMPENING SYSTEM

RELATED APPLICATION DATA

This application is a § 371 National Stage Application of PCT International Application No. PCT/FR2014/051422 filed Jun. 12, 2014 claiming priority of FR Application No. 1355861, filed Jun. 20, 2013.

TECHNICAL FIELD

The present disclosure relates to the field of damping systems for devices and tools and more particularly to the field of adjustable damping systems for cutting and drilling devices and tools.

BACKGROUND

The mounting of tools on an adapted interface of the motor device often requires the insertion of an intermediate part designed to limit the vibrations of the device and the tool in movement. In the case of a tool which functions in rotation, for example a cutting or drilling tool, vibrations can occur because of the resistance encountered by the cutting tool in contact with the material of the cut part. The radial vibrations interfere with the rotational movement of the cut part in relation to its axis of rotation. The intermediate damping system makes it possible to compensate for or cancel out radial vibrations which may be produced by the tool during rotation.

In general, the intermediate damping system is formed by a cylindrical part which forms a housing in which a cylindrical absorbent mass is arranged centred in the housing and held in position by elastic elements arranged on the periphery of the cylindrical mass, in contact with the internal wall of the cylindrical housing. The function of the absorbent mass is to vibrate in a phase offset to the cylindrical part of its housing and thus dampen radial vibrations generated by the cutting and in particular by the resistance encountered by the cutting tool. The damping/cylindrical mass assembly is then arranged to be aligned according to the axis of rotation of the machine and the tool. The various different elastic elements enable the damping of vibrational movements of the absorbent mass relative to the cylindrical part of the housing. The damping can be adjusted by modifying the elastic hardness of the elastic elements and by prestressing the latter. If the stiffness of the elastic elements/absorbent mass has not been adjusted, the cylindrical absorbent mass vibrates in a random manner and no longer performs its damping function.

An embodiment of an intermediate damping system integrating a prestressing mechanism is described in publication U.S. Pat. No. 6,443,673. In such a system, the absorbent mass is compressed between two elastomers in the cylindrical housing of the damping means by means of a clamping element. The clamping element forms part of the cylindrical housing of the damping means and forms a ramp for clamping elastomers mounted off-centre relative to the axis of the damping means. If such a device makes it possible to obtain a damping system in which the damping abilities can be adjusted, the device has the disadvantage of not being able to be integrated into existing cylindrical housing parts.

Document DE 1897206 proposes an alternative way of controlling the damping by using a mechanism for prestressing the elastomers mounted on the absorbent mass. In this embodiment, the elastomers are positioned in shoulders located at the ends of the absorbent mass and the volume of the latter is reduced relative to the elastomers positioned there. The stressing mechanism requires the insertion of a disc mounted close to the shoulder to make it possible during the displacement of the disc towards the shoulder to pressurise the part of the elastomer which passes beyond the shoulder. However, such a system is flawed not only in that it generates an interfering torsional or shearing stress of the disc against the elastomer, but also on the one hand forces the positioning of the elastomers at the ends of the absorbent mass and, on the other hand, causes an interfering pinching of the elastomer which reduces the effectiveness of the compression. The interfering pinching relates to the part of the elastomer which passes beyond the shoulder and is easily pinched between the disc and the end of the absorbent mass.

SUMMARY

The aim of the present disclosure is in particular to overcome the disadvantages by proposing a damping device, in which the damping can be adjusted and can be mounted or integrated into existing housing parts, at the same time ensuring optimised stressing or a prestressing, which is adjusted and controlled effectively by one or more elastomer elements.

The subject matter of the disclosure is thus a movable axial element for a damping system including a rectilinear absorbent mass designed to be positioned in a housing and having at least one annular groove arranged on the periphery of the absorbent mass and in which at least one elastic element is arranged which is designed to bear against the internal wall of the housing, characterised in that at least one groove of the periphery of the absorbent mass includes a base formed by a shoulder of the absorbent mass, and an edge formed by a structure bearing an annular lip mounted in a sliding manner on at least a part of the shoulder according to at least one axis of the movable element to form an adjusting device integrated into the movable element to enable the control of prestressing exerted by the annular lip on the elastic element mounted on the periphery of the absorbent mass, the prestressing being generated without rotation of the annular lip relative to the elastic element.

The subject matter of the disclosure also includes a system for damping radial vibrations for a turning, drilling, milling or machining tool mounted on a machine, the tool being movable in rotation relative to the machined part, the system comprising a hollow cylinder forming an axial housing, characterised in that the system integrates into its housing a movable axial element.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 2 is a schematic view of a movable axial element having an absorbent mass.

DETAILED DESCRIPTION

Figure 1:
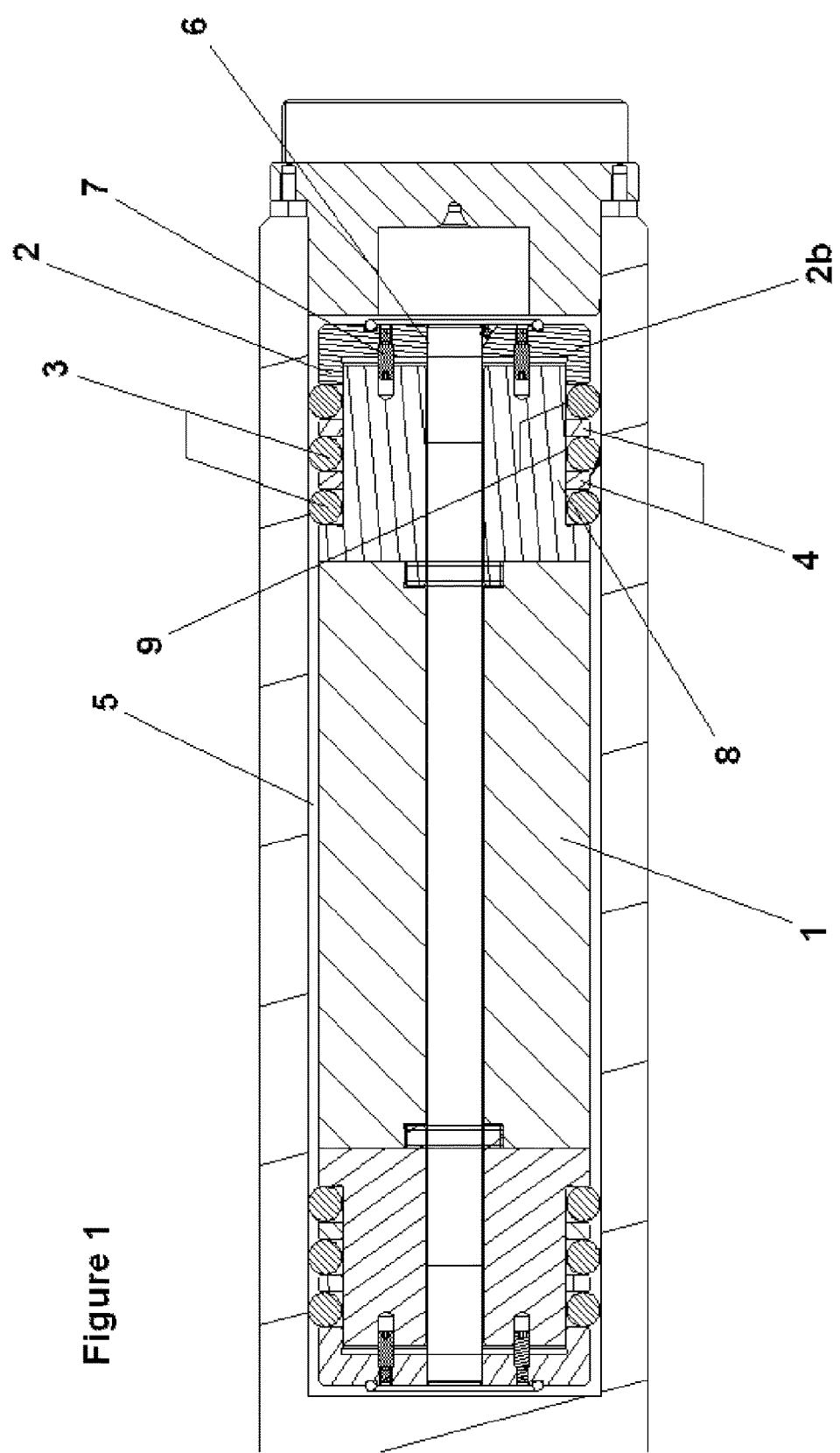
FIG. 1 is a schematic view of the damping system integrating a movable axial element according to the present disclosure.

Referring to FIG. 1, a movable axial element for a damping system includes a rectilinear absorbent mass 1 positioned in a housing 5 and having at least one annular groove 9 arranged on the periphery of the absorbent mass 1 and in which at least one elastic element 3 is arranged which is designed to bear against the internal wall of the housing 5. The at least one groove 9 of the periphery of the absorbent mass 1 includes a base formed by a shoulder 8 of the absorbent mass 1. An edge formed by a structure bearing an annular lip 2 is mounted in a sliding manner on at least one part of the shoulder 8 according to at least one axis of the movable element to form an adjusting device integrated into the movable element to enable the control of prestressing exerted by the annular lip 2 on the elastic element 3 mounted on the periphery of the absorbent mass 1, the prestressing being generated without rotation of the annular lip 2 relative to the elastic element 3.

When the movable axial element is positioned in the housing 5 of the damping system, the absorbent mass 1 of the movable element has sufficient inertia to reduce or suppress the radial vibrations of the tool associated with the damping system. According to a particular non-limiting feature, the absorbent mass 1 can be formed at least partly by a tungsten alloy with a mass distribution over the whole of the mass, which can be either homogenous or heterogeneous. According to another non-limiting embodiment, the movable element has a cylindrical cross-section arranged to be inserted into the housing with a cylindrical cross-section of the damping system.

When the movable axial element is in the housing 5, one or a plurality of elastic elements 3 mounted on the periphery of the movable axial element and bearing against the internal wall of the housing 5 of the system suspends the absorbent mass 1 in the housing 5 positioning the mass 1 radially, i.e. by centering the mass 1 in the housing 5. The absorbent mass 1 together with different elastic elements 3 limit and absorb the vibrations. This absorption of vibrations is then a function of the rigidity of the elastic elements 3 which are positioned in contact between, on the one hand, axially by groove 9 of the movable axial element and, on the other hand, radially by the internal wall of the housing 5 of the system. The control of the absorption is performed by adjusting the rigidity of the elastic elements 3 and therefore their damping ability. The rigidity is then adjusted by prestressing the elastic elements 3 to a greater or lesser extent when the movable element is at rest.

The greater the amount of prestressing exerted on the elastic elements 3 in a position of rest the greater the increase in rigidity of the elements 3, which together reduces their ability to absorb vibrations. For this reason the mobility of the movable axial element in the housing 5 of the damping system is also reduced.

As shown in FIGS. 1 and 2, the control and adjustment of the prestressing of the elastic element 3 is performed by a device integrated into the movable axial element. The device is formed in particular by the annular lip 2, which enables an adjustment of the volume of the groove 9 in which the elastic element 3 is positioned. The adjustment of this volume means that the elastic element 3 can withstand prestressing by compression. The control and adjustment of the volume thus enables the control and adjustment of the prestressing of the elastic element 3. The prestressing against the elastic element 3 is generated by a rectilinear axial displacement of the structure bearing an annular lip 2 against the elastic element 3. This prestressing by means of axial and rectilinear displacement makes it possible to limit or suppress the generation of shearing and torsional forces between the annular lip 2 and the elastic element 3.

Thus, the damping device includes at least one elastic element 3 accommodated in a groove 9 of the periphery of the absorbent mass 1 which includes a base formed by a shoulder 8 of the absorbent mass 1, and an edge formed by an annular lip 2 mounted in a sliding manner on at least one portion of the shoulder 8 according to at least one axis of the movable element to form a device for adjusting and controlling the prestressing exerted on the elastic element 3 mounted on the periphery of the absorbent mass 1.

The base of the annular groove 9, which forms the housing in which the elastic element 3 is positioned, is formed by the periphery of the absorbent mass 1 at the level of a shoulder 8 of the movable element. One of the edges of the annular groove 9 is then formed by an annular lip 2 mounted to be movable in translation on the surface of the shoulder 8 of the movable element. In order to be able to slide on the shoulder 8, the annular lip 2 has an inner diameter that is substantially identical or slightly greater, than the diameter of the cross-section of the shoulder 8 of the movable element. It should be noted that the annular lip 2 can be supported by a structure which surrounds, fits onto or caps one end of the absorbent mass 1 of the movable element so as to be movable in translation according to the axis of the absorbent mass 1. The displacement of the annular lip 2 enables the displacement of an edge of the annular groove 9 and by enlarging or reducing the volume of the annular groove 9 generates or modifies the prestressing exerted on the elastic element 3.

According to another embodiment, the axial element may include a plurality of grooves 9 each housing a respective elastic element 3, the grooves 9 being formed with variable widths along a portion of the shoulder 8 of the absorbent mass 1, with at least one movable edge formed by a sliding washer 4 separating two juxtaposed grooves 9, the sliding washer 4 having internal dimensions corresponding to the dimensions of the shoulder 8 of the portion of absorbent mass 1.

This particular feature makes it possible to position a plurality of juxtaposed annular grooves 9 in the same portion of length of shoulder 8, each being equipped with a respective elastic element 3. The different grooves 9 are then separated by sliding washers 4, which form walls shared by two consecutive grooves 9. In a succession of juxtaposed grooves, only the grooves located at the ends have one of their edges of walls formed by an element other than a sliding washer 4. Thus, the groove 9 closest to one end of the absorbent mass 1 includes, on the one hand, an edge formed by a sliding washer 4 and, on the other hand, an edge formed by the annular lip 2. Likewise the groove 9 farthest from the lip 2 has, on the one hand, an edge formed by a sliding washer 4 and, on the other hand, an edge, farthest from the lip 2, formed by the shoulder 8, that is the difference in diameter between the cross-section on which the washers 4 slide and the elastic elements 3 and the cross-section with a non-reduced diameter of the absorbent mass of the movable element. The edge formed by the shoulder 8 forms a stop against which the elastic elements 3 accommodated in the grooves 9 and the washers 4 that separate them slide by being pressed by the annular lip 2 in translation. This particular embodiment, by means of the sliding of the elastic elements 3 and washers 4, enables a homogenous distribution of the prestressing exerted by the annular lip 2 on the different elastic elements 3.

According to another embodiment, the annular lip 2 is joined in translation according to the axis of the absorbent mass 1 with a clamping structure 6 forming an axial interaction, on the one hand, with a portion of the absorbent mass 1 and, on the other hand, directly or indirectly, with the structure bearing the annular lip 2. This type of structure makes is possible to adjust the prestressing exerted by the annular lip 2 on the elastic elements 3 by a simple screwing/unscrewing operation.

According to a variant of the embodiment of FIG. 1, the annular lip 2 interacts directly via a thread/tapping with a surface of the absorbent mass 1. For example, the inner face of the annular lip 3 can have a tapping which cooperates with a thread on the peripheral surface of the shoulder 8 of the absorbent mass 1. Alternatively, the annular lip 2 can be mounted or integrated into a structure, itself mounted at one end of the absorbent mass 1 and comprising a threaded axis which interacts with a tapped opening of the absorbent mass 1.

According to a further embodiment the clamping structure 6 is formed by a threaded rod provided with a stop delimiting the displacement of the annular lip 2 according to the axis of translation, the stop interacting with a tapped opening arranged at one end of the absorbent mass 1, the clamping structure 6 being also equipped with an actuating interface. An arrangement of this kind makes it possible to control the sliding of the annular lip 2, the stop limiting the displacement of the annular lip 2 in reaction to the compression of the elastic elements 4, without the rotation of the threaded rod being imposed on the lip 2. Accordingly, the stop thus prevents the annular lip 2 from sliding out of the movable axial element. The stop also makes it possible to push the annular lip 2 against the elastic elements 3 and impose the prestressing generated by screwing the threaded rod.

According to another feature, the annular lip 2 is mounted to slide in translation and is locked rotationally relative to the absorbent mass 1 by means of at least one axial guiding element 7 having a first part inserted into an opening at one end of the absorbent mass 1 and/or a second part inserted into an adapted opening of the structure 2b supporting the annular lip 2. The guiding axis 7 may be off-centre relative to the axis of the movable element.

The axial element may have elastic elements 3 positioned on the periphery of parts of the absorbent mass 1 located at each end of the absorbent mass 1 and the prestressing of which is adjusted/controlled by respective adjusting and control devices arranged symmetrically. The movable axial element thus has a symmetrical arrangement according to a plane perpendicular to the axis of the movable element.

An arrangement of this kind makes it possible to arrange control and adjusting devices of groups of elastic elements 3 positioned at each end of the axial element. This arrangement makes it possible to obtain a different adjustment of each of the groups of elastic elements 3 and therefore impose absorptions of various different vibrations over the length of the movable axial element.

The clamping and adjusting devices may be actuated jointly by a common clamping structure 6. To achieve this, the annular lips 2 are arranged symmetrically, as well as elastic elements 3 and washers 4 forming walls for separating the elastic elements 3. However, the clamping structure 6 is shared and actuated by a single interface. An example of this joint actuation of the annular lips 2 positioned at each end of the movable axial element is a clamping structure 6 formed by two rectilinear parts to form a rod, each of the parts having, at a first end, a stop to interact, directly or indirectly, with a respective annular lip 2 and at a second end an interface for enabling axial interaction, for example thread/tapping, with the other rectilinear part of the clamping structure 6. The clamping structure 6 is arranged to form an axial element which traverses the absorbent mass 1 on its axis, the two parts of the rod clamping with their stops the annular lips 2 to the absorbent mass 1, and meeting at their second respective ends. At the second end, a first of the two parts comprises a thread for cooperating with a tapping on the corresponding end of the second part of the clamping rod. A first of the two parts is then mounted to be fixed in rotation and free in translation with the absorbent mass 1, whereas the second of the parts is mounted freely in rotation and translation. The axial rotation of the second part of the clamping rod relative to the first part of the rod involves modifying the length of the rod and jointly moving together or spacing apart the annular lips 2, one relative to another. The approach or simultaneous spacing apart of the annular lips 2 which slide on the surface of the shoulder 8 generates a homogenous prestressing of the different elastic elements 3 and washers 4 which separate them. According to a preferred feature of the embodiment, the second part of the clamping rod, free in rotation and in translation relative to the absorbent mass 1, has an actuating interface.

According to an embodiment of, the device for adjusting the axial element integrates a mechanism for indexing the prestressing exerted by the annular lip 2 on the elastic element 3. A non-limiting example of the indexing mechanism can consist of a graduation marked on the structure 2b which bears the annular lip 2 opposite which an indicator marked at one end of the clamping structure 6 is displaced jointly with the axial pivoting of the clamping structure 6.

The disclosure also relates to a system for damping radial vibrations for a tool mounted to be movable in rotation on a machine, the system being formed by a hollow cylinder forming an axial housing, characterised in that it integrates into its housing 5 a movable axial element according to the invention.

According to one particular feature, the vibration damping system is characterised in that one end of the housing 5 includes an opening making it possible to access an interface for actuating at least one device for adjusting and controlling the elasticity of at least one elastic element 3 mounted on the periphery of the absorbent mass 1 of the movable element. This arrangement makes it possible to adjust the damping of the movable element directly from the exterior of the housing 5, without it being necessary to remove the movable element from the housing 5. Furthermore, the actuation can be performed from an opening in the structure which forms the housing 5 and which is positioned opposite the actuating interface.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A movable axial element for a damping system, the axial element comprising:
a rectilinear absorbent mass positionable in a housing;
a plurality of annular grooves arranged on a periphery of the absorbent mass, each of the grooves housing an elastic element, each of the elastic elements being arranged to bear against an internal wall of the housing, each of the plurality of grooves including a base formed by a shoulder of the absorbent mass, the grooves having variable widths along a portion of the shoulder of the absorbent mass, wherein an edge formed by a structure bearing an annular lip is mounted in a sliding manner on at least one part of the shoulder along at least one axis of the movable axial element to form an adjusting device integrated into the movable axial element to enable the control of a prestressing exerted by the annular lip on at least one of the elastic elements mounted on the periphery of the absorbent mass, the prestressing being generated without rotation of the annular lip relative to elastic element; and at least one movable edge formed by a sliding washer separating two juxtaposed grooves, the sliding washer having internal dimensions corresponding to dimensions of the shoulder of the portion of absorbent mass.

2. An axial element according to claim 1, wherein the annular lip is connected in relation to the axis of the absorbent mass to a clamping structure forming an axial interaction on one end with a portion of the absorbent mass and on another end, directly or indirectly, with the structure bearing the annular lip.

3. An axial element according to claim 2, wherein the clamping structure is formed by a threaded rod provided with a stop limiting the displacement of the annular lip along the axis of and interacting with a tapped opening arranged at one end of the absorbent mass, the clamping structure being provided with an actuating interface.

4. An axial element according to claim 1, wherein the annular lip is mounted to slide in translation along the axis and is locked in rotation relative to the absorbent mass by at least one guiding axial element having a first part inserted into an opening at one end of the absorbent mass and/or a second part inserted into an adapted opening of the structure bearing the annular lip.

5. An axial element according to claim 1, further comprising elastic elements positioned on the periphery of parts of the absorbent mass located at each end of the absorbent mass and the prestressing of which is regulated/controlled by respective adjusting and control devices is arranged symmetrically.

6. An axial element according to claim 1, wherein the clamping and adjusting devices are actuated jointly by a common clamping structure.

7. An axial element according to claim 1, wherein the adjusting device includes a mechanism for indexing the prestressing exerted by the annular lip on the elastic element.

8. A vibration damping system for damping radial vibrations for a turning, boring, milling or machining tool mounted on a machine, the tool being movable in rotation relative to a machined part, the system comprising:

a hollow cylinder forming an axial housing; and a movable axial element included in the housing, the movable axial element including a rectilinear absorbent mass positionable in the housing and having a plurality of annular grooves arranged on a periphery of the absorbent mass, each of the grooves housing an elastic element being arranged to bear against an internal wall of the housing, each of the plurality of grooves including a base formed by a shoulder of the absorbent mass, the grooves having variable widths along a portion of the shoulder of the absorbent mass, wherein an edge formed by a structure bearing an annular lip is mounted in a sliding manner on at least one part of the shoulder along at least one axis of the movable axial element to form an adjusting device integrated into the movable axial element to enable the control of a prestressing exerted by the annular lip on at least one of the elastic elements mounted on the periphery of the absorbent mass, the prestressing being generated without rotation of the annular lip relative to elastic element, and at least one movable edge formed by a sliding washer separating two juxtaposed grooves, the sliding washer having internal dimensions corresponding to dimensions of the shoulder of the portion of absorbent mass.

9. The vibration damping system according to claim 8, wherein one end of the housing includes an opening which allows access to an actuating interface of at least one device for adjusting and controlling a prestressing exerted on at least one elastic element mounted on the periphery of the absorbent mass of the movable element.

* * * * *